US006825922B2

(12) United States Patent
Johnston et al.

(10) Patent No.: US 6,825,922 B2
(45) Date of Patent: Nov. 30, 2004

(54) DETERMINATION OF THE ANGULAR POSITION OF A LASER BEAM

(75) Inventors: Kyle S. Johnston, Sammamish, WA (US); Joseph A. Franklin, Vancouver, WA (US); Spencer G. Nelson, Bothell, WA (US); Charles M. Bass, Kirkland, WA (US)

(73) Assignee: Metron Systems, Inc., Snoqualmie, WA (US)

( * ) Notice: Subject to any disclaimer, the term of this patent is extended or adjusted under 35 U.S.C. 154(b) by 0 days.

(21) Appl. No.: 10/671,823

(22) Filed: Sep. 26, 2003

(65) Prior Publication Data

US 2004/0130707 A1 Jul. 8, 2004

Related U.S. Application Data

(60) Provisional application No. 60/413,938, filed on Sep. 26, 2002.

(51) Int. Cl.[7] .......................... G01B 11/26; G01B 11/24
(52) U.S. Cl. ...................................... 356/138; 356/601
(58) Field of Search ........................... 356/138, 139.07, 356/152.1, 601, 602, 606–608, 614; 250/234–236, 559.22, 559.24, 559.29; 359/212–218, 204, 206

(56) References Cited

U.S. PATENT DOCUMENTS

| 4,277,141 A | 7/1981 | Kleiber |
| 4,498,778 A | 2/1985 | White |
| 4,567,347 A | 1/1986 | Ito et al. |
| 4,587,531 A | * 5/1986 | Dangler ...................... 347/250 |
| 4,628,469 A | 12/1986 | White |
| 4,639,140 A | 1/1987 | Lerat |
| 4,759,593 A | 7/1988 | Kessler |
| 4,863,268 A | 9/1989 | Clarke et al. |
| 4,880,299 A | 11/1989 | Hamada |
| 4,932,784 A | 6/1990 | Danneskiold-Samsoe |
| 4,979,816 A | 12/1990 | White |
| 5,004,929 A | 4/1991 | Kakinoki et al. |
| 5,149,963 A | 9/1992 | Hassler, Jr. |
| 5,151,608 A | 9/1992 | Torii et al. |
| 5,157,486 A | 10/1992 | Baird et al. |
| 5,171,984 A | 12/1992 | van Rosmalen |
| 5,245,182 A | 9/1993 | Van Rosmalen et al. |
| 5,450,219 A | 9/1995 | Gold et al. |
| 5,489,985 A | 2/1996 | Mochida et al. |
| 5,510,889 A | * 4/1996 | Herr ........................... 356/5.1 |
| 5,550,668 A | 8/1996 | Appel et al. |
| 5,617,133 A | 4/1997 | Fisli |
| 5,739,912 A | 4/1998 | Ishii |
| 5,754,215 A | 5/1998 | Kataoka et al. |
| 5,777,311 A | 7/1998 | Keinath et al. |
| 5,789,743 A | 8/1998 | Van Rosmalen |
| 5,828,479 A | 10/1998 | Takano et al. |

(List continued on next page.)

FOREIGN PATENT DOCUMENTS

| EP | 0377973 | 7/1990 |
| EP | 03198650 | 8/1991 |
| EP | 0618472 | 10/1994 |

OTHER PUBLICATIONS

A Real–time Optical Profile Sensor For Robot Arc Welding, Oomen et al, Proceedings Of The SPIE, vol. 449, Intelligent Robots: RoViSeC3, 1983 pp. 62–71.

(List continued on next page.)

Primary Examiner—Michael P. Stafira
(74) Attorney, Agent, or Firm—Reed Smith LLP; William J. McNichol, Jr.; Matthew J. Esserman

(57) ABSTRACT

A system for measuring the external surface profile of a component using a non-contact optical technique which scans the field of view with a spot of light through a range of angles by utilizing a rotating mirror system and which precisely determines the angular position of the spot of light during scanning.

71 Claims, 10 Drawing Sheets

U.S. PATENT DOCUMENTS

| | | |
|---|---|---|
| 5,864,394 A | 1/1999 | Jordan, III et al. |
| 6,046,801 A | 4/2000 | Liu et al. |
| 6,151,564 A | 11/2000 | Vescovi et al. |
| 6,205,406 B1 | 3/2001 | Hahn et al. |
| 6,441,908 B1 | 8/2002 | Johnston et al. |

OTHER PUBLICATIONS

Science Applications International Corporation, "Recent Applications of Laser Line Scan Technology and Data Processing", SAIC Science and Technology Trends, 1998, pp. 190–195.

"Motor/Polygon Speed Stability Definition and Measurement", Lincoln Laser Scanning Systems, 1993, Appl. Note #214, pp., 1–4.

Planar Substrate Surface Plasmon Resonance Probe with Multivariate Calibration (section entitled "2. Theory of Light Pipe SPR Sensors"), Ph.D. Dissertation, Univ. Washington, 1996, Kyle S. Johnston, 25 pages.

* cited by examiner

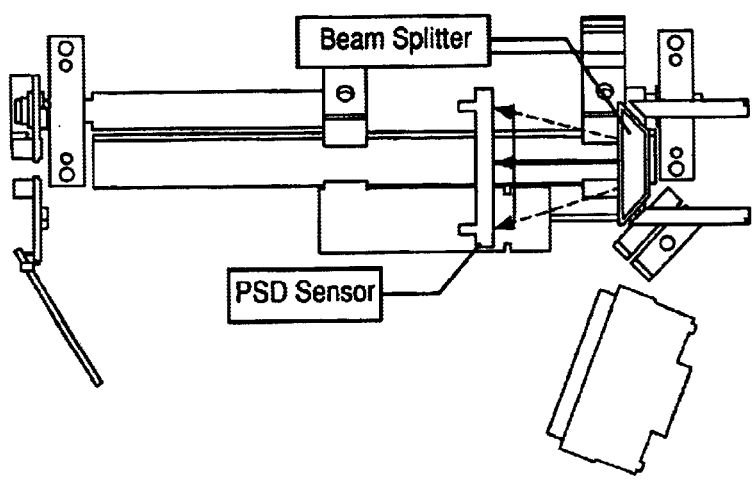
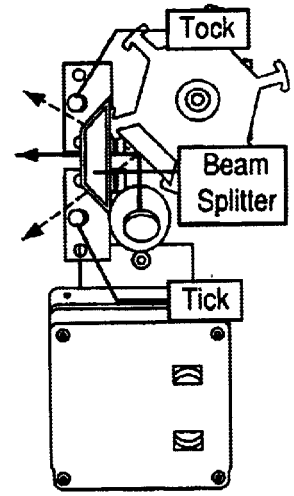
FIG. 7a
FIG. 7b
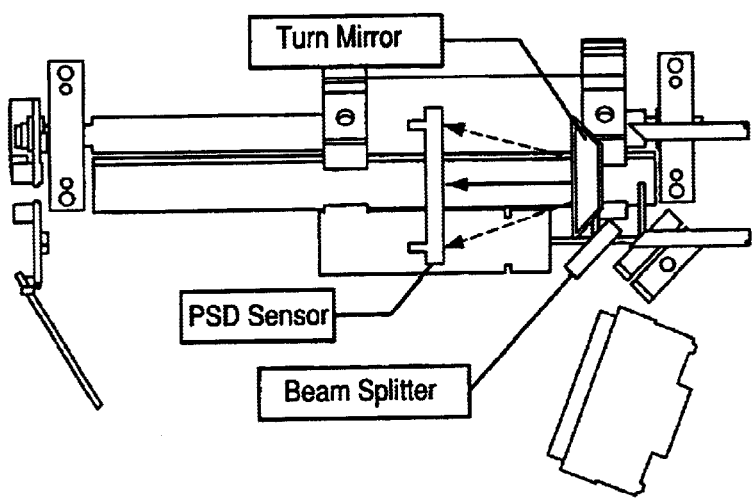
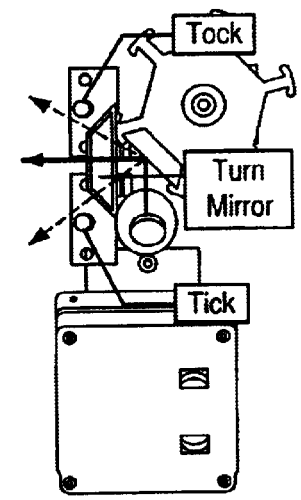
FIG. 8a
FIG. 8b

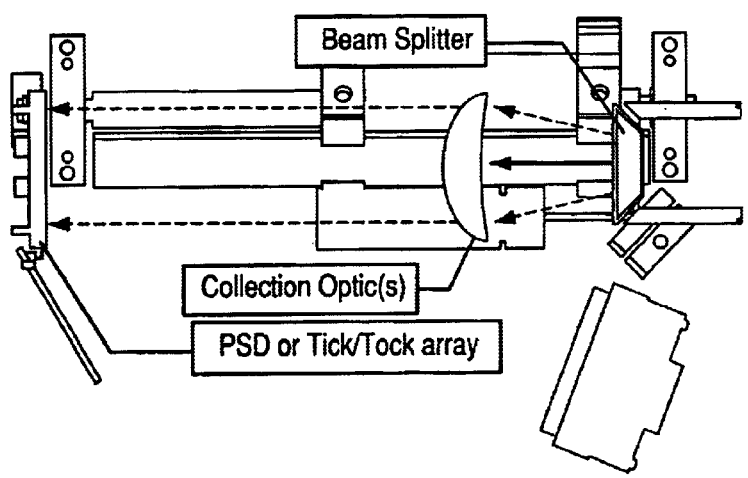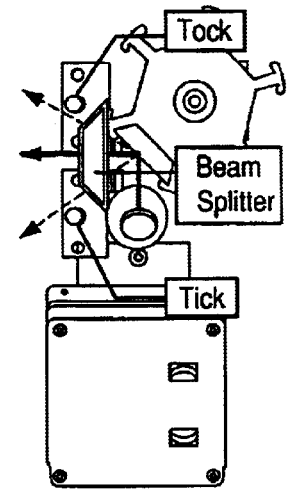
FIG. 9a  FIG. 9b
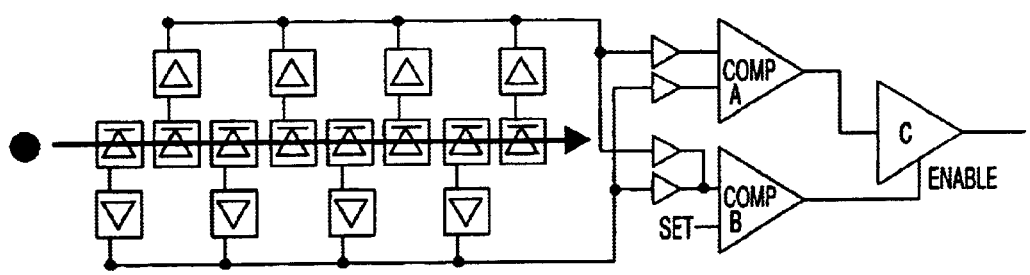
FIG. 10

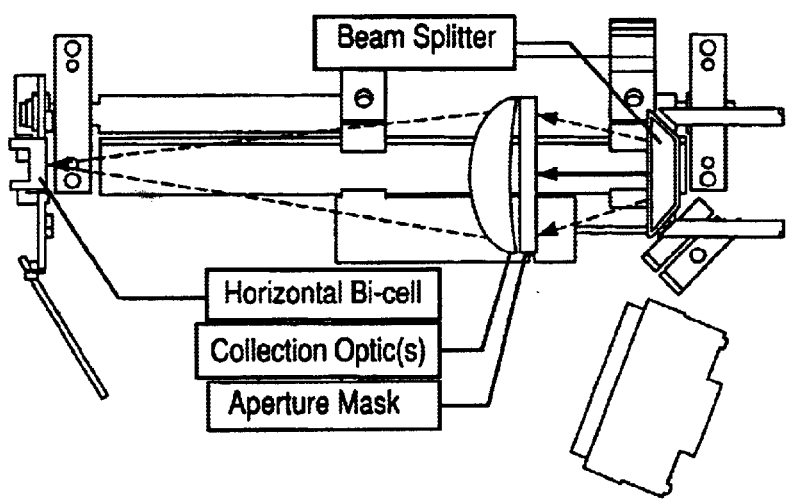
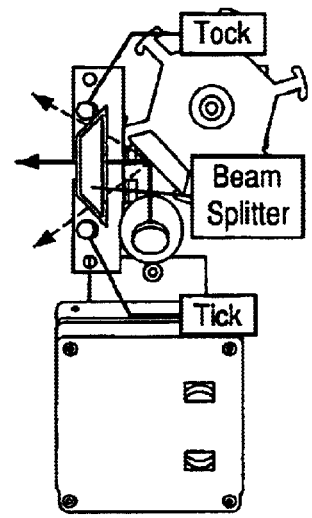
FIG. 12a
FIG. 12b
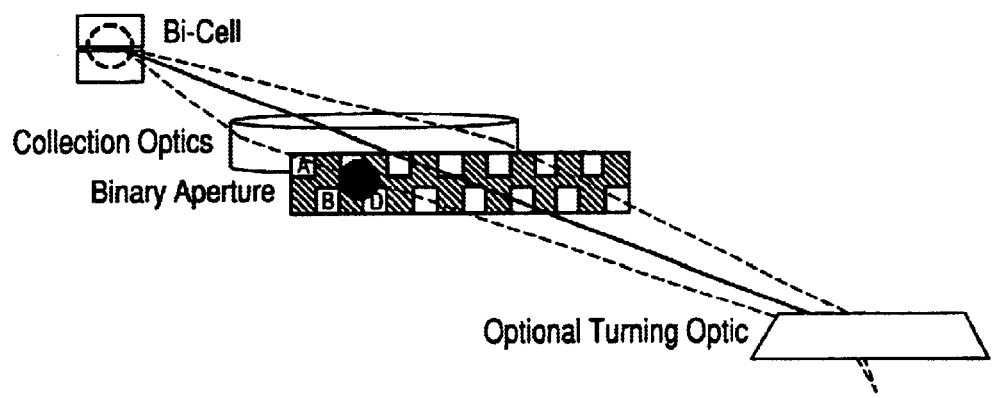
FIG. 13

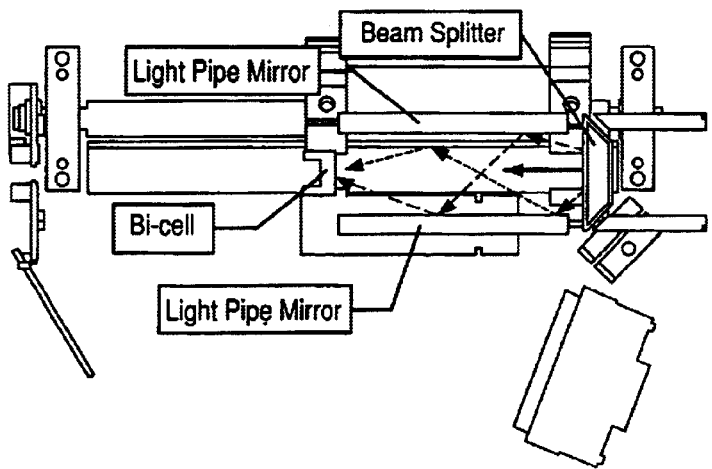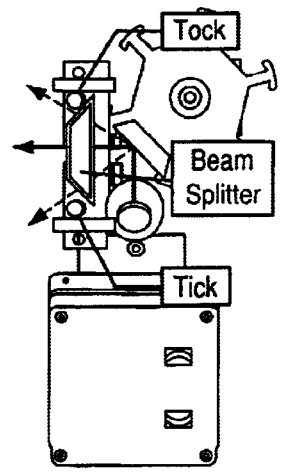
FIG. 14a
FIG. 14b
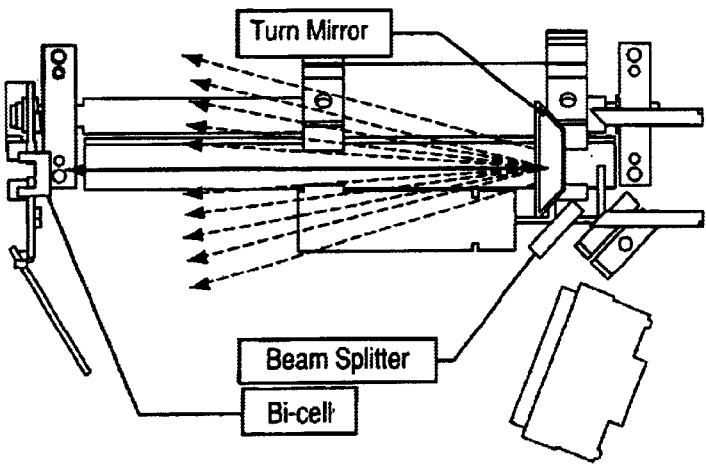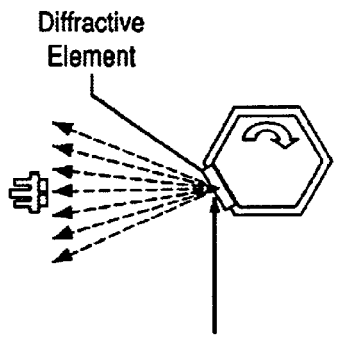
FIG. 15a
FIG. 15b

DETERMINATION OF THE ANGULAR POSITION OF A LASER BEAM

This application claims priority from provisional application 60/413,938, filed Sep. 26, 2002.

FIELD OF THE INVENTION

The present invention relates generally to the field of scanning devices. In particular, the present invention relates to the profiling of a component which includes scanning a spot of light through a range of angles. More specifically, the present invention relates to the measuring of the external surface profile of a component using a non-contact optical technique. Even more specifically, the present invention relates to the measuring of the external surface profile of a component using a non-contact optical technique which scans the field of view by utilizing a rotating mirror and which precisely determines the angular position of the spot of light during scanning.

BACKGROUND OF THE INVENTION

The present invention describes several highly accurate methods for determining the pointing angle of a laser beam. The theory and use of these inventions are introduced by examining how these inventions aid the construction and use of a non-contact laser scanning system. A body of useful prior art for this work is described in U.S. Pat. No. 6,441,908, issued to Johnston et al.

We have developed an instrument where some form of light illuminates a spot on the surface of an object to be measured. The light source is usually a laser beam and the beam is usually first reflected off a mirror, as shown in FIG. 1. By repositioning the mirror, usually using a rotational motion, we can reposition the light spot to measure a series of locations along the surface of the object. The challenge is to determine, very accurately, what the position of the mirror is so we can accurately determine the position of the laser (ideally to within 50 $\mu$rad) and ultimately determine the position of the laser on the object.

Mechanical Position Method

One class of previous techniques for determining the pointing angle of a laser have required measuring the mechanical deflection of the mirror using techniques that include the use of rotary encoders and specialized potentiometers. The laser deflection can then be inferred using the fact that $$\theta_{Optical} = 2\theta_{Mechanical}. \tag{0}$$

Due to noise, jitter and limited resolution, these mechanical deflection methods typically do not suffice for measuring beam position down to 50 $\mu$rad.

Constant Velocity Method

A potentially more useful technique for determining the pointing angle of the laser is to make optical measurements of the laser beam as it is swept over a range of angles and then infer the position using angular velocity. As shown in FIG. 2, the laser first sweeps across an initial position sensor (Tick). This event latches a high precision counter, resulting in an initial timer value ($T_{Tick}$). The timer is also latched for each $i^{th}$ desired measurement of the laser beam position ($T_i$). Finally, as the laser crosses the end of scan position sensor (Tock), the timer is again latched ($T_{Tock}$). These sensors can be any photo-detector but it is assumed in this disclosure that the high resolution bi-cell optical trigger configuration is used.

If the angular distance between Tick and Tock ($\Delta\theta$) are known (i.e. fixed or predetermined) and we assume a constant angular velocity, then it is possible to calculate a high precision angular position value for the $i^{th}$ position measurement ($\theta_i$) using $$\theta_i = \theta_0 + \omega_0 t_i + \frac{1}{2}\alpha t_i^2 \tag{1}$$

where $\omega_0$ is the initial angular velocity and $\alpha$ is the (constant) angular acceleration. First, we arbitrarily set $\theta_0 = \theta_{Tick} = 0$. This reduces (1) to $$\theta_i = \omega_0 t_i + \frac{1}{2}\alpha t_i^2. \tag{2}$$

The average value of $\omega$ can be found using $$\langle\omega\rangle = \frac{\Delta\theta}{\Delta T} = \frac{\theta_{Tock} - \theta_{Tick}}{T_{Tock} - T_{Tick}}. \tag{3}$$

Assuming no angular acceleration, e.g. $\alpha=0$, the $i^{th}$ angular position ($\theta_i$) relative to $\theta_{Tick}$ can be determined after the sweep is complete by substituting $\langle\omega\rangle$ for $\omega_0$ and using $$\theta_i = \langle\omega\rangle T_i = \frac{\theta_{Tock} - \theta_{Tick}}{T_{Tock} - T_{Tick}} T_i. \tag{4}$$

This optical angular velocity technique can suffice for measuring beam position down to 50 $\mu$rad as long as there is no angular acceleration and the counter is of sufficiently high resolution with low jitter in the triggering/latching circuits. This technique has the advantage of not requiring a specific value of $\omega$ as long $\omega$ remains constant during the sweep so that at any time the instantaneous angular velocity (($\omega_i$) approximates the average velocity, $$\omega_i \approx \langle\omega\rangle. \tag{5}$$

Constant Acceleration Method

The constant velocity method can fail when there is sufficient angular acceleration present between Tick and Tock to invalidate (5). In the special case where $\alpha$ is slowly varying, such as a sine wave, then the value of $\alpha$ can be approximated as constant between Tick and Tock. In such a case, knowledge of the initial angular velocity ($\omega_{Tick}$) and final angular velocity ($\omega$tock) suffice to determine the laser position with sufficient accuracy. These new angular velocity values can be measured using a variation of the configuration as shown in FIG. 3. A pair of Tick trigger sensors separated a known distance ($\Delta\theta_{Tick}$) is provided, as well as a corresponding pair of Tock sensors.

The $i^{th}$ angular position can now be found using $$\theta_i = \omega_0 T_i + \frac{1}{2}\langle\alpha\rangle T_i^2 \text{ where} \tag{6}$$

$$\langle\alpha\rangle = \frac{\omega_{Tock} - \omega_{Tick}}{\Delta T_{Tock}} = \frac{\omega_{Tock} - \omega_{Tick}}{T_{Tock} - T_{Tick}} T_i \text{ and} \tag{7}$$

$$\omega_0 = \omega_{Tick} = \frac{\theta_{Tick2} - \theta_{Tick1}}{T_{Tick2} - T_{Tick1}}, \quad \omega_{Tock} = \frac{\theta_{Tock2} - \theta_{Tock1}}{T_{Tock2} - T_{Tock1}}. \tag{8}$$

Challenge of Instantaneous Acceleration

The constant velocity and constant acceleration methods of determining the angular position of the beam using optical measurements suffice for "well behaved" motion profiles of the rotating deflection mirror, e.g. where there is no appreciable instantaneous acceleration. However, when $\alpha$ is not constant between Tick and Tock, large errors in the determined value of $\theta_i$ can result. Such a case can result if a resonant device such as a torsional pendulum structure rotates the mirror. This is a case where both $\alpha$ and $\omega$ are described by sine waves with periods of approximately twice the time between Tick and Tock. If the structure was tuned so that the motion was just sufficient for the beam to cross both Tick and Tock, then $\omega_{Tick} \approx \omega\text{Tock}=0$ and (6) clearly breaks down. A similar extreme case is simulated in FIGS. 4a and 4b where a mirror rotating with a base velocity of $\omega_0=1.0$ RPS has a 6 Hz sinusoidal velocity variation with amplitude of 0.5 RPS. The solid line in FIG. 4a shows the actual velocity and the dashed line shows the velocity calculated using (3). The dashed line in FIG. 4b shows the expected position of the mirror using (4), which is significantly different than the actual position shown as a solid line, up to 10 degrees in the center of the sweep. FIG. 4b would be identical if (6) were used because the initial and final velocities are the same.

Another case where (6) breaks down is when an instantaneous acceleration "event" perturbs an otherwise constant motion profile. This can occur many ways, such as when an impulse from nearby equipment causes a vibration event or when the whole system is in motion in a fashion that couples with the angular momentum of the mirror or, even more subtle, when the bearings bind or drop into a "groove" in their races.

Acquiring and Using Angular Motion Data

The preceding discussion illustrates that a more refined method is needed to profile the acceleration, velocity or position profile between the Tick and Tock sensors. Properly accomplished, enough motion data between Tick and Tock would allow breaking $\Delta\theta$ into sufficiently small angular ranges where the acceleration can be considered constant. In practice, acquiring this data can be difficult. Examination of FIG. 2 shows that, unless a transparent sensor is used, the Tick and Tock sensors block the outgoing beam at the beginning and end of the beam sweep. Any subsequent motion data between Tick and Tock must be acquired without fully blocking the outgoing measurement beam.

The several methods for gathering sufficient motion data between Tick and Tock that are described in this disclosure can be organized into the categories of:

Mechanical measurement techniques directly coupled to the motion of the deflection mirror. These techniques generally provide noisy, low-resolution data available as a constant stream of measurements between Tick and Tock;

Optical techniques where a portion of the outgoing measurement beam is sampled and measure to provide motion data. The techniques described here are typically high resolution, low jitter data available as a small set of discreet samples spanning between Tick and Tock; and Optical techniques where a separate beam is directed off the deflection mirror and measured to provide motion data. The separate beam can be from a separate source or sampled off the input beam before the deflection mirror.

These and other advantages of the present invention will become more fully apparent from the detailed description of the invention hereinbelow.

SUMMARY OF THE INVENTION

The present invention is directed to a system for high-precision determination of the angular position of a light beam in an optical scanning device, the system comprising: a source of light that emits a substantially collimated primary light beam; a light-sensitive sensor; an optical element used to focus an image onto the sensor; and a rotatable mirror system that re-directs the primary light beam to a plurality of locations of an external surface of a component, the rotatable mirror system comprising: a rotary axis; a mirror structure that rotates about the rotary axis; at least one detector positioned to intercept a light beam that has been reflected off the mirror structure at an angle representing a start-of-scan such that a first trigger pulse is generated, and positioned to intercept a light beam that has been reflected off the mirror structure at an angle representing an end-of-scan such that a second trigger pulse is generated; and an auxiliary system that provides measurement data between the start-of-scan angle and the end-of-scan angle; wherein the first trigger pulse and the measurement data are used to determine the angular position of the primary light beam.

In one embodiment, the auxiliary system includes a measurement device which is coupled to the rotary axis, and wherein the first and second trigger pulses and the measurement data are all used to determine the angular position of the primary light beam.

In another embodiment, the auxiliary system includes an auxiliary light-sensitive sensor and a beam splitter, wherein the beam splitter is positioned to intercept the primary light beam subsequent to reflecting off of the mirror structure, and wherein the beam splitter re-directs a portion of the primary light beam onto the auxiliary sensor.

In yet another embodiment, the auxiliary system includes an auxiliary light-sensitive sensor and a beam splitter, wherein the beam splitter is positioned to intercept the primary light beam prior to reflecting off of the mirror structure, and wherein the beam splitter re-directs a portion of the primary light beam onto the mirror structure which reflects the re-directed primary light beam portion onto the auxiliary sensor.

In still yet another embodiment, the auxiliary system includes an auxiliary light-sensitive sensor and an auxiliary light source, wherein the auxiliary light source emits a substantially collimated auxiliary light beam onto the mirror structure which reflects the auxiliary light beam onto the auxiliary sensor.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

FIGS. 7a and 7b are bottom and side views, respectively, of a laser scanning system including a beam splitter used to sample a portion of a measurement beam after deflection from the rotor and a PSD (Position Sensitive Detector) sensor used to optically measure the angular position of the sampled beam, in accordance with a preferred embodiment of the present invention. In FIG. 7b (the side view), the PSD sensor is not shown for simplicity purposes.

FIGS. 8a and 8b are bottom and side views, respectively, of a laser scanning system including a beam splitter used to sample a portion of a measurement beam before deflection from the rotor and a PSD sensor used to optically measure the angular position of the sampled beam, in accordance with a preferred embodiment of the present invention. In FIG. 8b (the side view), the PSD sensor is not shown for simplicity purposes.

FIGS. 9a and 9b are bottom and side views, respectively, of a laser scanning system including a beam splitter used to sample a portion of a measurement beam after deflection from the rotor, collection optic(s) used to collect and redirect the sampled beam, and a PSD sensor used to optically measure the angular position of the sampled beam, in accordance with a preferred embodiment of the present invention. In FIG. 9b (the side view), the collection optic(s) is not shown for simplicity purposes.

FIG. 10 is a schematic view illustrating a Tick/Tock bar configuration where a sweep of the sampled beam crosses an array of N=8 photodiodes (i.e. along the center), in accordance with a preferred embodiment of the present invention. The buffered output of every other detector is wired to a comparator, resulting in a series of N−1=7 sharp trigger transitions.

FIGS. 12a and 12b are bottom and side views, respectively, of a laser scanning system including a beam splitter used to sample a portion of a measurement beam after deflection from the rotor, an aperture mask used to pass the upper or lower portion of the sampled beam in an alternating fashion, and the collection optic(s) used to collect and redirect the sampled beam to the horizontally oriented bi-cell, in accordance with a preferred embodiment of the present invention. In FIG. 12b (the side view), the aperture mask and collection optic(s) are not shown for simplicity purposes.

FIG. 13 is an isometric schematic view of the optics path for the masking technique, in accordance with a preferred embodiment of the present invention.

FIGS. 14a and 14b are bottom and side views, respectively, of a laser scanning system including a beam splitter used to sample a portion of a measurement beam after deflection from the rotor and the light-pipe structure used to create a series of discrete sweeps across the vertically oriented bi-cell, in accordance with a preferred embodiment of the present invention.

FIGS. 15a and 15b are bottom and side views, respectively, of a laser scanning system including a diffractive element applied to a mirror creating a series of discrete beams that sweep past the single bi-cell to create a series of discrete trigger events as the rotor turns, in accordance with a preferred embodiment of the present invention. In FIG. 15a (the bottom view), the diffractive element is not shown for simplicity purposes. FIG. 15b (the side view) illustrates the equivalent optical path without any folds in the system.

In FIG. 16a (the bottom view), the diffractive element and collection optic(s) are not shown for simplicity purposes. FIG. 16b (the side view) illustrates the equivalent optical path without any folds in the system.

DETAILED DESCRIPTION OF THE PREFERRED EMBODIMENTS

Figure 1:
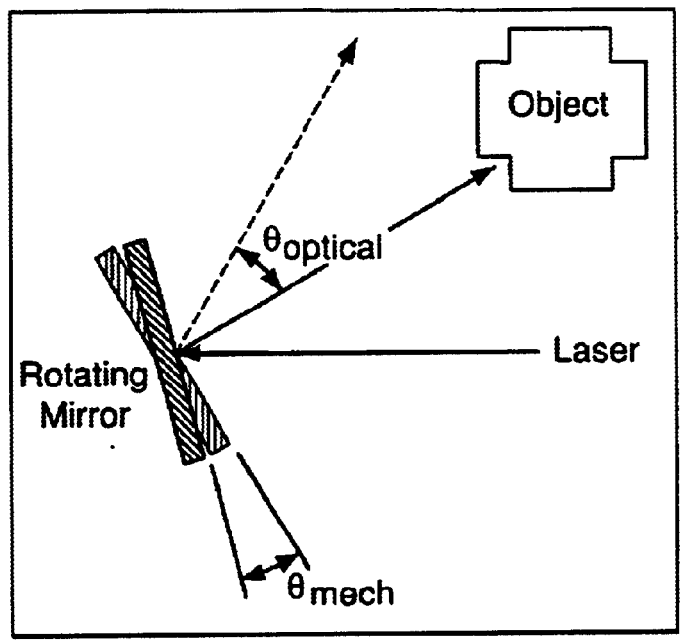
FIG. 1 is a simplified illustration of a laser beam intersecting a surface of an object while being swept across the surface by rotation of a mirror in accordance with the prior art.
Figure 2:
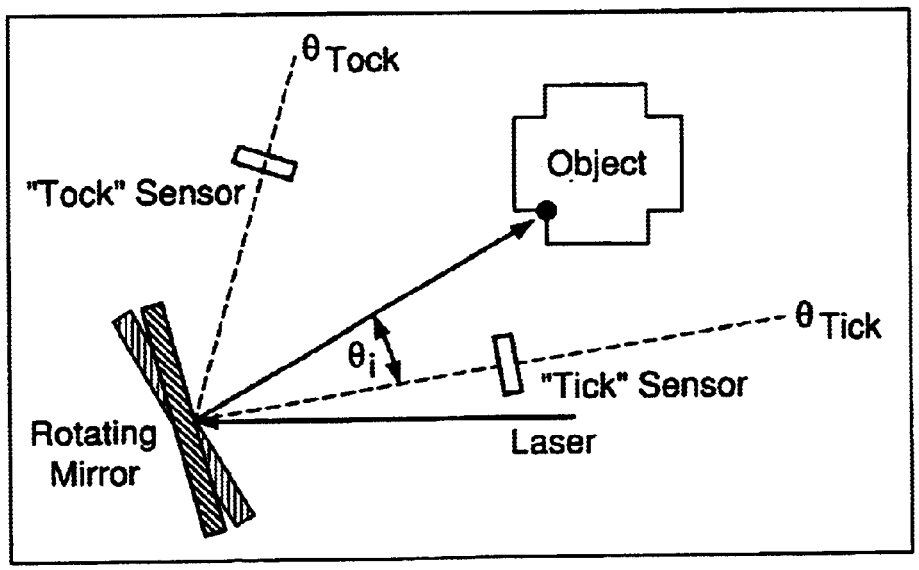
FIG. 2 is a simplified illustration of a configuration for optically inferring laser position using velocity in accordance with the prior art.
Figure 3:
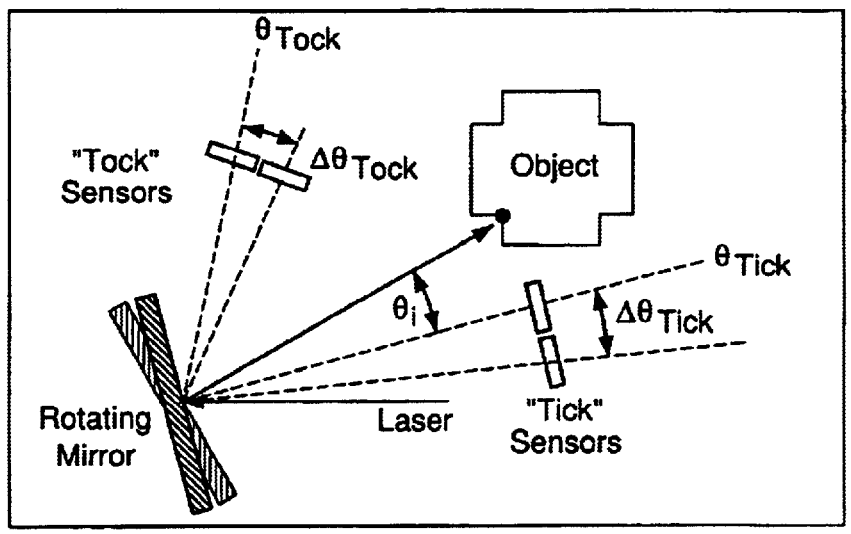
FIG. 3 is a simplified illustration of a configuration for optically inferring laser position using velocity and initial/final acceleration in accordance with the prior art.
Figure 4A:
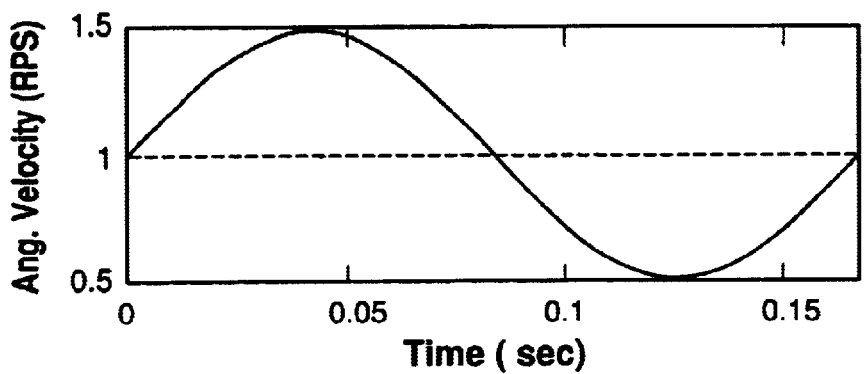
FIGS. 4a and 4b are plots illustrating an example of position error due to variations in angular velocity.
Figure 4B:
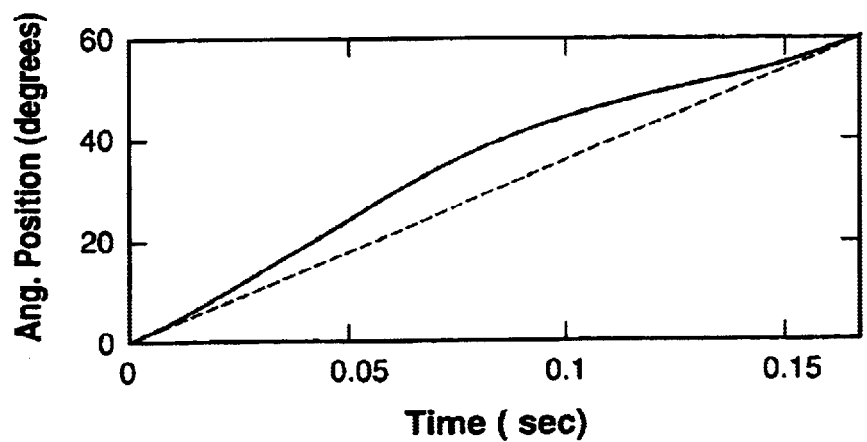

Reference will now be made to the drawings wherein like structures are provided with like reference designations. It will be understood that the drawings included herewith only provide diagrammatic representations of the presently preferred structures of the present invention and that structures falling within the scope of the present invention may include structures different than those shown in the drawings.

The inventions in this disclosure are intended for, but not limited to, measuring the position of a rotating mirror used to deflect the measurement beam in a non-contact laser scanner profilometer, similar to the systems discussed in U.S. Pat. No. 6,441,908. Unlike laser "writing" applications that need to hit a specific spot, here we are satisfied with measuring precisely where the beam was when the measurement was taken and have the luxury of making an accurate determination after the whole sweep is complete. Examples of the implementations and identification of the preferred techniques will be made as they relate to laser scanning profilometry applications.

Mechanically Coupled Measurements

Mechanically derived data from a sensor attached to a rotation axle could provide data between Tick and Tock. Measurements of the angular position of a measurement beam with 50 μrad accuracy cannot typically be conducted using mechanically coupled sensors due to noise, jitter, temperature variances, limited resolution and other limitations. However, the use of mechanically coupled measuring devices can aid in increasing the accuracy of a Tick/Tock system by providing a profile of the angular motion between the Tick and Tock sensors. A laser scanner system for using this is illustrated from different perspectives in FIG. 5a and FIG. 5b.

Here, a laser 10 is reflected off a folding mirror 20 and off the one mirror 30 of a 6-sided rotor (with 5 mirrors removed for simplicity purposes). The resulting reflected beam is swept over a range of ~100° as the rotor turns, 60° of which is allowed through the base plate through the aperture 40. The beam illuminates the object to be measured and the scattered light passes back through the base plate, off mirror 30, off fold mirror 50 and is imaged onto camera 70 by the optics 60. On either side of aperture 40 are pick-off mirrors 80 that reflect a small angular range of the swept beam straight down the base plate and across the Tick/Tock sensors 90. In this fashion, as the rotor turns, a Tick and Tock signal are generated at the beginning and end of the sweep. To augment measuring the rotor position between Tick and Tock, an angular measuring device 100 is coupled to the end of the rotor shaft.

The mechanically coupled angular measuring device can potentially be based on one of many different existing technologies, including but not limited to a potentiometer, an optical encoder, a magnetic encoder, a resolver, or a Rotary Variable Differential Transformer. Some of the variables in play when choosing the device are the cost, linearity, resolution, noise, jitter, temperature coefficient, and how big the dead zone is, if there is one. One difference between the technologies is that the continuous sensors such as the potentiometers can be queried at regular time intervals, yielding irregular spaced angular data. In contrast, the "digital" devices such as the optical encoder will generate interrupts to latch the counter, resulting in periodic angular data at irregular time intervals. Although the optical encoder is currently favored due to its low cost, non-contact nature and lack of dead zone, the basic use of the data from all these sensors is very similar.

Simulated Example Data

Figure 5A:
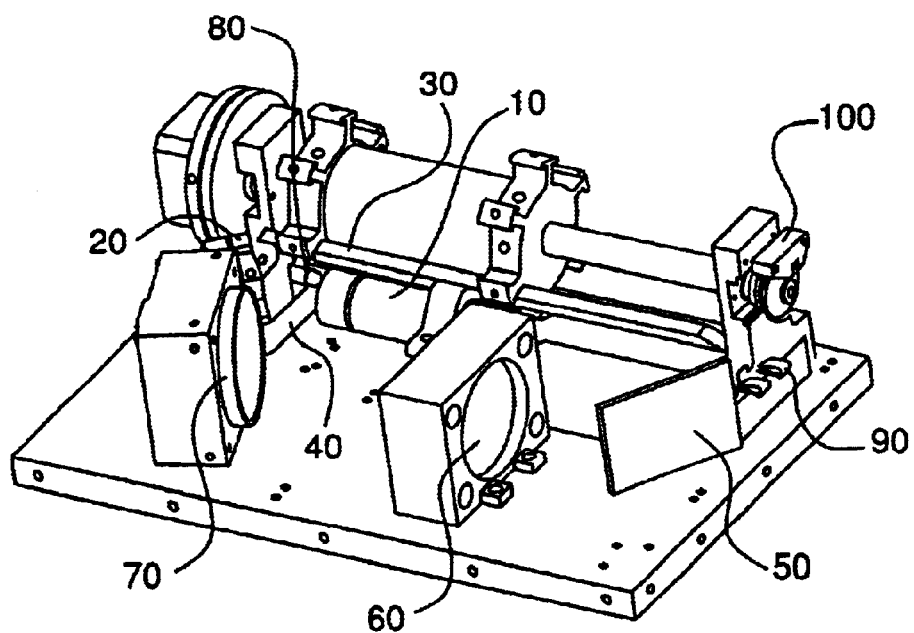
FIGS. 5a and 5b are isometric views of a laser scanning system including mechanically coupled measurements augmenting a Tick/Tock scheme, in accordance with a preferred embodiment of the present invention.
Figure 5B:
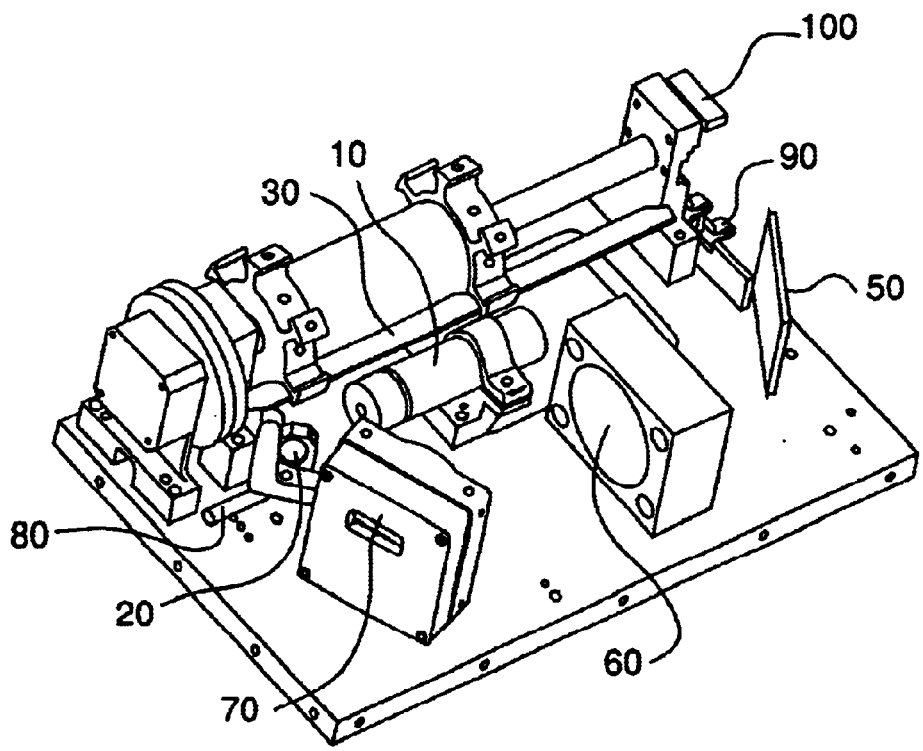
Figure 6A:
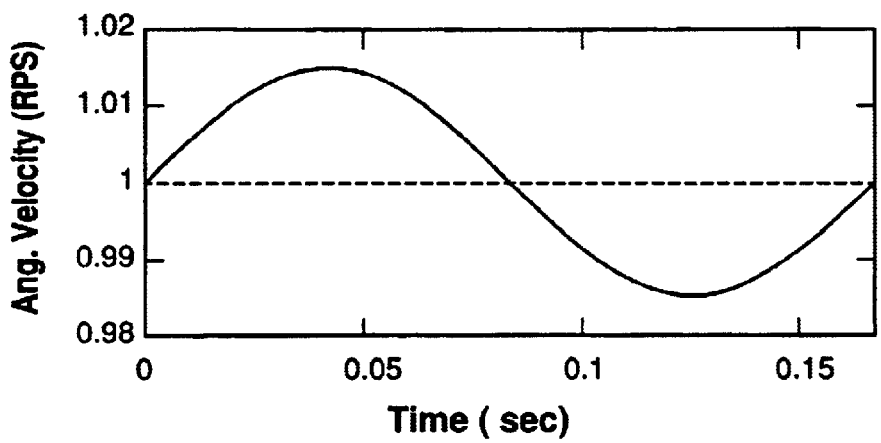
FIGS. 6a–6c are plots illustrating simulated data and analysis from a sensor mechanically coupled to a rotor shaft, in accordance with a preferred embodiment of the present invention.

To illustrate the use of semi-continuous data available from a sensor mechanically coupled to the rotor shaft of the rotating mirror in FIGS. 5a and 5b, a simulated data set was constructed. As shown in FIG. 6a, a base angular velocity of 1.0 RPS (the dashed line) is disturbed by a 1.5% (0.015 RPS) sinusoidal perturbation with a period of 30° (mechanical), resulting in the solid line.

To simulate the readout of a mechanically coupled sensor, the position of the rotor was "poled" 600 times over a 30° (mechanical) range. This is equivalent to a 7200 count/rev encoder or a continuous sensor poled at 10.8 KHz. The initial and final angular velocities would be 1.0 RPS, so both the Constant Velocity and Constant Acceleration techniques would have large position errors with a maximum of 3.25 mRad (0.18°) in the center of the sweep, as shown by a solid line that is hidden, but runs down the middle of the somewhat fuzzy line in FIG. 6b.

Figure 6B:
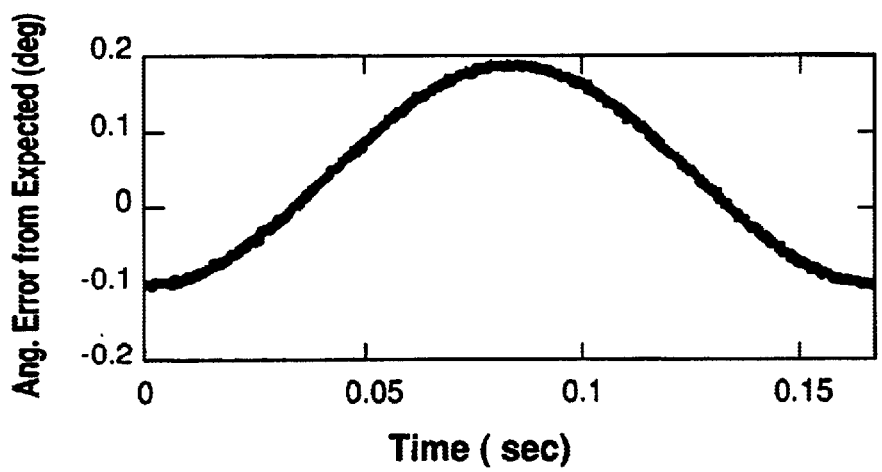
Figure 6C:
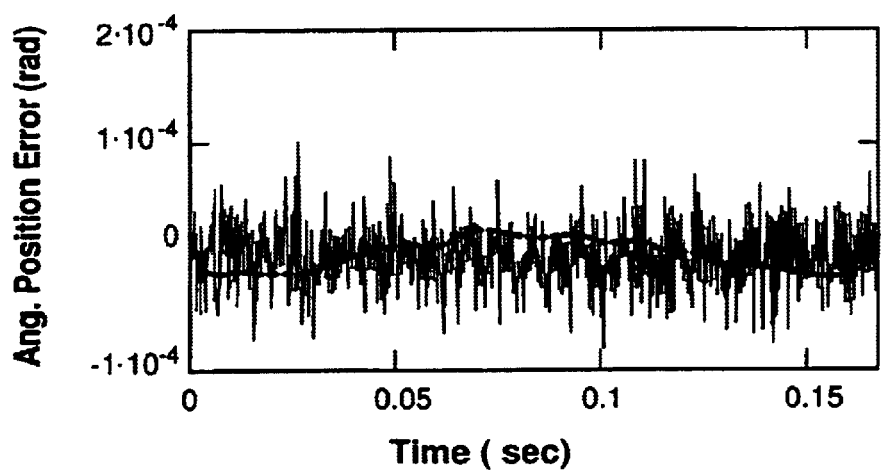

Noisy data: In the absence of sensor noise, the position sensor would suffice to directly map the position of the beam after accounting for the mechanical to optical conversion mentioned in (0). Unfortunately, real sensors suffer from noise that significantly degrades the ability to accurately determine the position of the rotor and hence the beam. In this analysis, we will disregard the error in the 20 MHz or 40 MHz counters as insignificant. Instead, we will focus on errors such as latching trigger errors caused by jitter in the encoder signal, which is in some ways equivalent to the reading errors in the continuous signal sensors such as potentiometers. To simulate this, a Gaussian error with a standard deviation of 29.7 µrad was added to the sensor signal. This is actually a very small amount of noise, equivalent to 1:216000 of a revolution or 1/30 of an encoder period. The somewhat fuzzy line in the FIG. 6b shows the resulting noisy signal. The noisy line in FIG. 6c shows the difference between the actual position and the noisy reading. Although the 29.7 µrad standard deviation result is vastly better accuracy than the Constant Velocity method provides, the maximum error in this simulation is 102 µRad. When Equation (0) is accounted for, this is 4 times desired specification.

Filtered Sensor Data: If we make the assumption that the rotor velocity is slowly varying and the sensor reading has Gaussian noise, then it is legitimate to employ a digital filter to smooth the sensor data. The dashed line in FIG. 6c is the result of applying an adaptive nearest neighbor smoothing algorithm to the data. In this case, the filtered results have a standard deviation of 13.6 µRad with a maximum error of only 25.1 µRad. When accounting for the mechanical to optical translation in Equation (0), this just slightly misses the desired specifications.

With the smoothed data set and the correlated timer values, we can create a function to allow us to "look up" a smoothed value for any $i^{th}$ timer value, $$\beta_i = f(T_i) \qquad (9)$$

where $\beta_i$ is the resulting smoothed value, $T_i$ is the $i^{th}$ timer value and $f(\ )$ is the function. There are many options for the formulation of $f(\ )$. If, as in this example, the sensor data is sufficiently dense, a simple interpolation routine can be used to find a value of β for a timer value that lands between two sensors readings. Some other function options include fitting a spline to the smoothed sensor data or even a high order polynomial.

There are many choices and a large body of existing research to utilize when choosing the optimal digital filter for this application. Ultimately, the noise content of the sensor and the poling frequency will highly influence the choice of techniques; another variable is the amount of processing power available. A windowed FIR filter (e.g. Gaussian or Hanning) should suffice for most applications, although an appropriate wavelet filter might be better for suppressing the fundamental sensor noise without biasing the measurement. One major challenge is to handle the roll over, e.g. from 359° to 1°. If the sensor has a dead-zone, then locating it to occur between mirrors will allow accumulation of enough readings so the filter can recover before the beam enters the Tick/tock sweep area.

It should be noted that sensors that produce a velocity-based signal could be used in this application. In this case, a continuous signal filter is easier to implement due to the lack of roll over. However, the output of a velocity sensor would need integrating to obtain position data. The drawback to this is the noise that makes it through the filter is also integrated and the resulting position data tends to be noisier and have more bogus structure than obtained with position sensors.

Fixed Pattern Errors: In the absence of other signal degradation and offset, the preceding filter techniques would suffice to determine beam position to the desired specification. However, real sensors suffer from fixed pattern errors that can significantly affect the accuracy of measured position values. In optical encoders, these can be due to off-center mounting, resulting in a sinusoidal offset with the same period as the rotation, or they can be due to lithography errors on the encoder wheel, resulting in nonlinear spacing between counts. Other sensors can be influenced by non-homogeneous material or non-uniform windings to provide similar fixed pattern errors. If these errors have been mapped so that the offset is known as a function of position then the measurements can be adjusted by the known offsets, resulting in a much more accurate position value using $$\phi = \epsilon(\beta), \qquad (10)$$

where φ is the corrected angular value, β is the input value and $\epsilon(\ )$ is the mapping function.

An ideal method of mapping these fixed pattern offsets is to rotate the mirror and log the sensor data for many thousands of rotations, then average the results. Any transient motion artifacts should average out over so many revolutions, leaving only the fixed sensor pattern or motion artifacts in the averaged signal. The resulting data can be fit with a continuous polynomial, interpolated in a look up table or even fit with splines for a smooth error map. Another advantage of this technique is the resolution of the mapping is increased when so many averages are available due to the noise dropping by a factor of approximately N/root(N).

Scaling and Temperature Compensation: One drawback to many of the continuous sensors, such as potentiometers, is that with changes of temperature, their output signals change by amounts larger than those expected from purely material expansion. If relying solely on such a sensor for determining angular position, large errors in the angle determination could result. Fortunately, the changes from temperature can be characterized as a linear scaling temperature coefficient. While a separate temperature sensor could be used to derive a temperature and compensate the reading from the angular sensor, the Tick and Tock sensors can be used to provide a high resolution fixed reference to provide both the proper scaling coefficient and take care of equation (0) at the same time.

Since for any sweep the angular space between Tick and Tock ($\Delta\theta$) is known as well as $T_{Tick}$ and $T_{Tock}$, we can use (9) and (10) to determine the corresponding values of the angular sensor, $\phi_{Tick}$ and $\phi_{Tock}$. Then, for any measurement that occurred at $T_i$, we can find the angular position of the beam ($\phi_i$) using $$\theta_i = \frac{\Delta\theta}{\Delta\phi}\phi_i = \frac{\theta_{Tock} - \theta_{Tick}}{\phi_{Tock} - \phi_{Tick}}\varepsilon(\beta_i) = \frac{\theta_{Tock} - \theta_{Tick}}{\phi_{Tock} - \phi_{Tick}}\varepsilon(f(T_i)). \quad (11)$$

Optical Measuring Techniques

PSD Sensors: Optical measurements of the beam deflected off a turning mirror can be directly measured to provide angular position data between Tick and Tock. The laser scanning system in FIGS. 5a and 5b can be modified as shown in the new system in FIGS. 7a and 7b to allow continuous optical measurement of the deflected beam. A beam splitter can be used to re-direct a portion of the outgoing beam after reflection off the mirror, the sampled beam can be directed onto a PSD sensor, providing a continuous position reading that can be sampled at will. Note that, as shown, the pick off can happen at a different level than the tick tock mirrors to allow unobstructed beam paths for both techniques. Typically, PSD sensors are used with signal conditioning so they have a signal that varies between values of −1 to 1 as the beam sweeps from one end to the other of the sensor. Acquisition and analysis of the signal from the PSD can proceed in the same fashion as that discussed for continuous signals from the mechanically coupled sensors, including any of the steps of smoothing if required, mapping the non-linearity and combining with the Tick and Tock sensors for a highly accurate measure of the beam position of any measurement i.

Separate Beam Paths: As an alternate to disturbing the measurement beam after deflection, FIGS. 8a and 8b depict an implementation where a beam splitter is used to sample a portion of the beam before it is deflected off the turning mirror. This sampled beam can be directed off the rotating deflection mirror, ideally in a parallel path to the outgoing measurement beam. The sampled beam can be directed onto a PSD sensor, providing a continuous position reading that can be sampled at will. FIGS. 8a and 8b show an option that is ideal for all the implementations in this disclosure, where a folding mirror is used to direct the beam to keep the optics path in a compact form inside the instrument case. Note that FIGS. 8a and 8b show a separate beam being used to measure the angular position of a beam deflected off the rotating mirror. The use of one or both of the Tick and Tock signals provides a fixed reference to allow the data from the separate beam to be used to infer the position of the measurement beam. Instead of splitting off the main beam, it is also possible to use a separate light source, such as another laser, for all the cases in this disclosure where a beam is sampled off the incoming beam before the rotating mirror. In such a case, the sensor beam path can be directed off any part of the rotating mirror, allowing convenient location inside the instrument case. Since all the mirrors on the rotor are rigidly fixed together, the sensor beam can be directed off a completely different mirror of the rotor assembly. In the case of a single resonant mirror, the beam can even be directed off the backside of the main deflection mirror. The previously discussed smoothing, mapping and combining with Tick and Tock will allow all these options to provide high resolution, accurate data between Tick and Tock.

Collection Optic(s): The implementations in FIGS. 7a, 7b, 8a, and 8b show the PSD located so the total path from the rotor mirror to the detector is rather short. Maximizing this path length will increase the resolution of the system. Also, the middle of the case might not be an optimum detector location. Unfortunately, the PSD sensors can practically be only a few inches long, making it hard to capture the whole 60° sweep of the beam. FIGS. 9a and 9b show a method of utilizing collection optic(s) to collect the angular sweep of the beam and partially or completely convert it to a lateral sweep, also allowing the detector to be located at the end of the case. As shown, one ideal optical configuration is a telecentric one where the lens is placed so that the total path length from the rotor mirror to the lens is equal to the focal length of the lens. In all the configurations in this disclosure, pickoff of the sample beam can be done with conventional beam splitters or mirrors, or can be accomplished with diffractive elements designed to simultaneously sample, shape and redirect the beam. The mapping techniques discussed earlier will help linearize the sensor response when using collection optic(s). Collection optic(s) will work just as well for configurations with separate paths for the measurement beam.

Discreet Sensors

It is technically feasible to replace the PSD in any of the preceding figures with an array of individual photo-sensors or an array of individual bi-cells. FIGS. 9a and 9b show an implementation where a beam splitter is used to re-direct a portion of the outgoing beam after reflection off the mirror, then a collection optic(s) is used to redirect the divergent sampled light onto a series of individual tick/tock sensors at known angular intervals, resulting in a series of precise counter triggers at regular angular intervals. The implementation in FIGS. 9a and 9b show the collection optic(s) (e.g. lens) placed in the telecentric position so the total beam distance from rotor mirror to lens equals the focal length of the lens. In FIG. 9b (the side view), the collection optic(s) is not shown for simplicity purposes.

A series of individual bi-cells could be employed as individual Tick sensors to provide high resolution, low jitter discrete triggers at regular intervals for latching the high-speed counter. This requires N photo-sensors arranged in N/2 pairs, resulting in N/2 precision trigger transitions. Another way of getting more trigger transitions with the same number of photodiodes is shown in FIG. 10. An array of N detectors is wired so that the optionally buffered output of every other detector is connected in common to a buffered input leg of comparator A. In this fashion, N-1 sharp transitions at regular intervals result as the beam sweeps across the array. To keep spurious triggers from occurring, the combined signal from all the detectors is buffered and added up in one channel of comparator B. The other leg of comparator B is a selectable voltage level that can be set so the output will only be TRUE when the combined photo-signal is above the SET threshold. The output of buffer C will only follow the transitions out of comparator A when enabled by a TRUE value out of comparator B. These transitions can be used to trigger the latching of a high-speed counter. As will become apparent, the more discrete triggers available, the higher the accuracy of the results. Therefore, the use of a commercially available 32 cell array in a configuration like that in FIG. 10 would be ideal. Any method of conditioning the photo-diode signal before the comparators will suffice; avoiding individual buffers for each detector would be ideal.

Figure 11A:
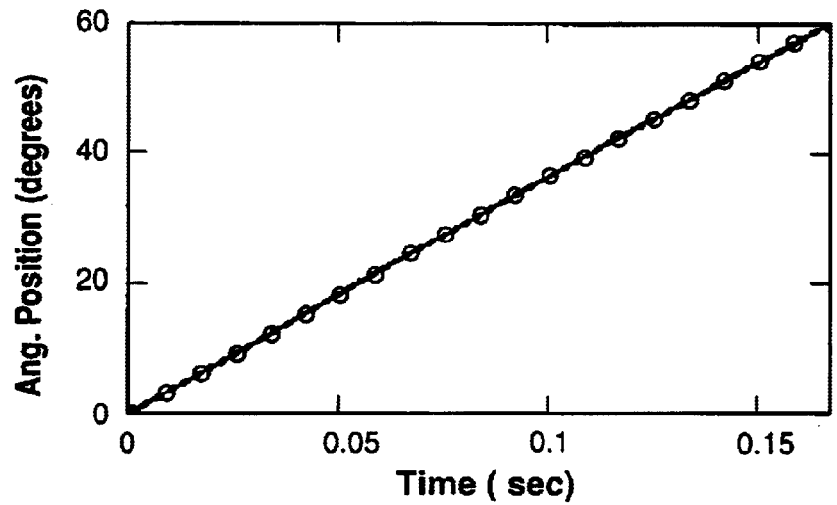
FIG. 11a and 11b are plots illustrating simulated data from FIG. 6 sampled and analyzed using 21 discreet optical signals to provide angular position data between Tick and Tock.

Fixed Pattern Mapping: The signal processing to utilize a small number of high resolution, low jitter trigger events that span the distance from Tick to Tock is similar in concept to that previously discussed for continuous, high noise sensors. FIG. 11a shows the simulated angular position vs. time for the identical base velocity and perturbation conditions as depicted in FIG. 6. In FIG. 11a, the somewhat fuzzy line is the actual (simulated) position and the circles show where the 21 discrete transitions are measured.

Unlike the continuous sensors, the position error due to noise and jitter for the bi-cell driven trigger events is very low. Like the Tick and Tock sensors, the optics for the beam position measurements shown in FIGS. 9a and 9b are stable and highly repeatable. Therefore, the angular position for each trigger transition is a fixed and stable value. The map of the fixed pattern of position of each transition can be obtained using a technique similar to that discussed leading to Equation (10). If the rotor velocity events are random in nature, after enough rotations, the average velocity, $<\omega>$ will equal $\omega_0$ and a position value of each $m^{th}$ trigger ($\theta_m$) can be found by first finding the average time for the $m^{th}$ trigger, $<T_m>$, and interpolating between $T_{Tick}$ and $T_{Tock}$ using $$\theta_m = \theta_{Tick} + \frac{T_m - T_{Tick}}{T_{Tock} - T_{Tick}}(\theta_{Tock} - \theta_{Tick}). \quad (12)$$

Signal Processing: Possessing the table of $\theta$ values for each trigger value, the value of any $i^{th}$ measurement that lands between the $\theta_m$ and $\theta_{m+1}$ trigger readings can be found by straight interpolation using $$\theta_i = \theta_m + \frac{T_i - T_m}{T_{m+1} - T_m}(\theta_{m+1} - \theta_m). \quad (13)$$

Figure 11B:
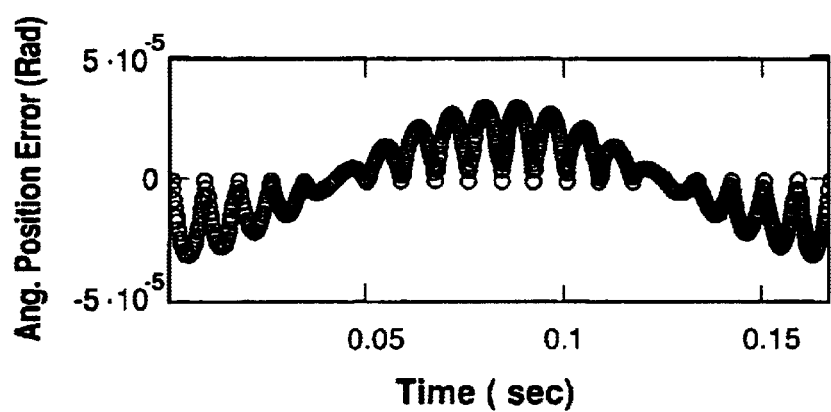

FIG. 11b shows the difference between the actual angular position of the simulated beam and the position determined applying (13) to the discrete position data in the plot of FIG. 11a. The standard deviation of the errors is 15.8 $\mu$Rad and the maximum error is 30.4 $\mu$Rad, easily passing the desired measurement specifications. It is clear that the residual plot in the FIG. 11b is the result of linear interpolation of a sine curve. Depending on the processing power available and the need for more accurate data, better interpolation results could be obtained by fitting spline curves to the data or even a high order polynomial. Interestingly, once a configuration like FIGS. 9a and 9b is implemented with discrete sensors, the use of Tick and Tock become somewhat optional as the first and last transitions on the array can serve as the Tick and Tock values.

As with most configurations in this disclosure, the implementation in FIGS. 9a and 9b will work with a beam split off before the rotating mirror, similar to the pick-off shown in FIG. 8a. The implementation will also work with a beam from a separate source that can be placed anywhere in the instrument case. Utilizing the hard coupled correlation between the active deflection mirror and the other mirrors on the rotor or the backside of the active deflection mirror, the sample beam can optionally be directed off any of those other mirror surfaces. As with most configurations in this disclosure, when a separate beam path is used for the sample beam, it is desired but not required to use a fold mirror to fold the path and keep it in a compact form inside the instrument case.

Masking Techniques

FIGS. 12a, 12b, and 13 show another method for creating a series of discrete trigger events to span the angular space between Tick and Tock. Regardless of the source, the sample beam is deflected off the rotating mirror and swept over a large range of angles. Collection optic(s) intercept the beam and re-direct it to a bi-cell photo-detector oriented with the dividing line along the direction of the beam sweep. Examination of FIG. 12b shows that the deflected beams can be traced back to appear as if they originated from a small locus we will call the source region. The collection optic(s) can be chosen to image the source region onto the bi-cell. In such a case, as the beam sweeps across the collection optic(s), it's intercept location on the bi-cell will remain static, with the top half of the beam illuminating the upper photo-cell and the bottom half illuminating the lower photo-cell. As with the Tick and Tock sensors, any periodic event that causes the intensity of the beam to switch back and forth between the upper and lower photo-cells can be used to create a high resolution optical trigger pulse.

To create these periodic intensity swings, FIG. 13 shows the placement of an aperture mask/plate between the source region and the collection optic(s), although in practice it can be on either side of the collection optics(s). The top half of the aperture plate contains alternating transparent and opaque regions, with the same pattern repeated out of phase on the lower half. As the beam commences its sweep along the aperture, the top half of the beam will pass through opening A and illuminate the top photo-cell, while the lower half of the beam is blocked. As the sweep proceeds, a portion of the top half of the beam will be blocked by the obstruction next to opening A while a portion of the lower half of the beam will start to pass through opening B. The point where the intensities on the two photo-cells is balanced can be used to create a high resolution trigger event identical to the Tick and Tock events that will repeat periodically as the beam sweeps down the rest of the aperture plate. Using previously mentioned analytical techniques, these triggers can be used to derive high resolution angular position data between Tick and Tock. The shape of the apertures, overall shape of the aperture plate, aspect ratio and duty cycle of the aperture plate can be tailored to fit the application. Limiting the aperture sizes so the beam can not pass through two upper of lower openings simultaneously will enhance the resolution of the trigger events.

Light Pipe

We have discussed techniques for creating discrete trigger events between Tick and Tock by passing a beam across multiple photo-sensors. We have also accomplished the same results by periodically interrupting portions of the sample beam falling on a single detector. FIGS. 14a and 14b show another technique in which a light pipe structure is used to break the sweep of the sample beam into multiple smaller sweeps that periodically cross a single detector or a small array of sensors. As can be seen in FIG. 14a, there is a beam pointing angle that will travel straight down the axis of the light pipe and intercept the surface of the bi-cell. As the beam sweeps, a different pointing angle will satisfy the condition where the beam will bounce off one of the light pipe walls and intercept the bi-cell. Further along the sweep, the beam will bounce first off one wall, then another and then intercept the bi-cell. If the conditions allow, as the beam sweeps past the center point, it with continue to undergo increasing numbers of odd or even bounces. Each time it undergoes a new reflection, the beam will sweep past the bi-cell, creating a series of discrete high resolution trigger events that can be designed to span the angular distance between Tick and Tock.

The theory and optimization of light pipe structures has been well studied (see K. S. Johnston, *Planar Substrate Surface Plasmon Resonance Probe with Multivariate Calibration*. Ph.D. Dissertation, Univ. Washington, 1996). The light pipe is usually constructed of two mirrors facing each other with a stable gap between them. The length and gap of the light pipe are the primary variables that will determine the number of discreet sensor crossings and the angular range between them. Although FIG. 14a shows a short structure, generally a structure that extends as far as possible will yield the most transitions. To artificially extend the length, it is possible to place a mirror at the end and direct the beam back down the structure to a bi-cell located at the initial opening. This bi-cell can be on the other side of a beam splitter or, if the mirror at the end has a slightly cocked angle, located either above or below the location of the beam entering the structure. A tapered gap in the light pipe structure can be used to further control the angular occurrence of the trigger events and even used to offset the irregular spacing of the trigger events due to tangent effects. It is noted that a light pipe comprising additional mirrors may also be contemplated such as, for example, a light pipe comprising 3 mirrors in a triangular configuration.

Alternately, the light pipe can be a crystalline substance with the light traveling inside and bouncing off the walls via mirrors or TIR. Perhaps the most ambitious use of a light pipe is where the rotating mirror and the light pipe structure are combined in a long box type structure. The long box type structure comprises the rotating mirror for deflecting the measurement beam on one large face, side walls for forming a light pipe structure, and a 45° mirror facet at one end of the light pipe structure to deflect the sample beam into the light pipe much like the beam splitter in FIGS. 14a and 14b deflects the sample beam into that light structure. This structure can be an open box structure or a crystalline slab with polished/mirrored faces. The bi-cell is located at the far end of the structure from the input facet. When the structure rotates relative to the stationary sample and measurement beams to create the sweep of the measurement beam, the sample beam is diverted into the light pipe, swept across a range of angles and broken up into many small sweeps that emerge from the end of the structure and sweep across the bi-cell. This configuration is very compact and has very few components to create a series of discrete angular measurements between Tick and Tock.

Multiple Spot Diffractive Element on Rotor

Another method of creating a series of discrete angular measurements is to employ a series of discrete sample beams. FIGS. 15a and 15b depict one method of accomplishing this where a diffractive element is applied where the sample beam strikes the rotor surface. If the diffractive element has the properties of a diffraction grating, then a series of diffracted beams at regular angular intervals will result, as depicted in FIG. 15b. As the rotor turns, these beams will be swept across the bi-cell detector, resulting in a series of discrete trigger events for determining angular position between Tick and Tock.

Unlike many implementations in this disclosure, this technique would not work well if the diffractive element was placed where the measurement beam strikes the rotor and a beam splitter was used to sample the resulting array of sweeping beams. The profusion of output beams illuminating the object would likely interfere with the measurement process.

One drawback to placing the diffractive element on the rotating mirror is the efficiency of the diffractive element will suffer with the variable incident angle of the illumination beam. This will make the intensity of the output beams variable, which will challenge the discriminator circuit that only enables a trigger when enough intensity is present. A specifically compensative design of the diffractive element will help resolve this issue.

Multiple Spot Diffractive Element

Figure 16A:
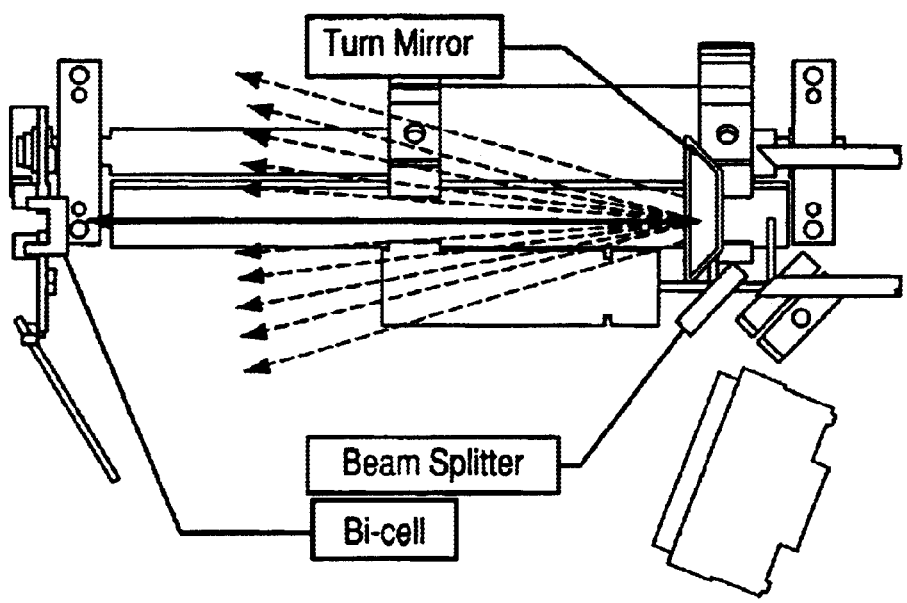
FIGS. 16a and 16b are bottom and side views, respectively, of a laser scanning system including a diffractive element used to create a series of discrete beams that are collected and directed to the mirror, creating a series of discrete beams that sweep past the single bi-cell to create a series of discrete trigger events as the rotor turns, in accordance with a preferred embodiment of the present invention.
Figure 16B:
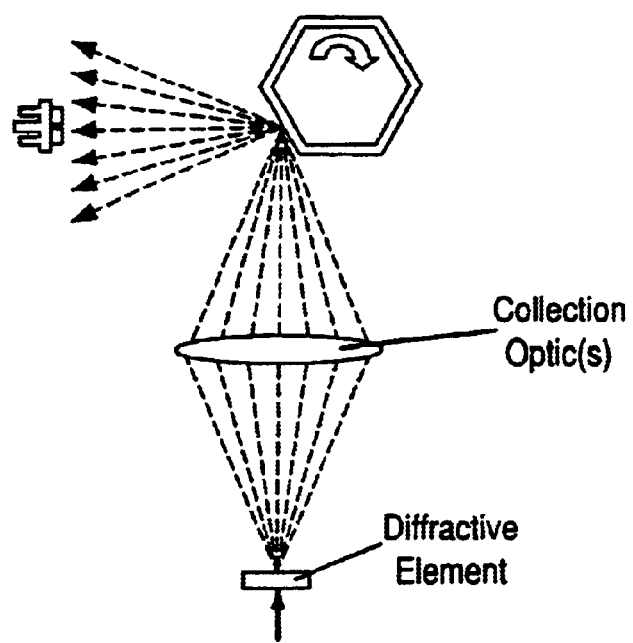

Instead of creating multiple discrete beams at the rotor surface, FIGS. 16a and 16b depict a method of creating the multiple beams in advance and directing them all onto the rotor. Here, the sample beam is directed through a transmissive diffractive element to create a series of discrete diffracted sample beams. Alternately, a reflective element could produce the same results. The diffractive element would need to function primarily as a diffraction grating. To get 21 discrete beams over a 60° envelope would require a primary groove density of 6.68 lines/mm. A holographic element would be ideal here because it could be used to slightly shape the beam and ensure that all the beams had similar intensity.

If the diffracted beams were aimed directly at the rotor, they would spread out before being reflected and end up creating a complicated optical path that might not all land on a single detector. To solve this, collection optic(s) is used to collect and redirect all the beams onto the rotor, where they will be reflected and swept through a range of angles much like the system in FIGS. 15a and 15b. The collection optic(s) would be placed ~2 focal lengths from both the diffractive element and the source region on the rotor. As the rotor turns, one of the discrete beams at a time will sweep across the bi-cell creating a series precise triggers at regular angular intervals. There is some slight advantage to focusing just past the surface of the rotor in order to minimize the difference in optics path of the beams that are falling on the single detector at any given rotor angle. The farther the bi-cell is from the rotor, the greater the angular resolution of the resulting trigger events.

General Considerations

The preceding implementations for deriving high accuracy angular position data of a measurement beam were illustrated as applying to a laser scanner system with a polygon rotor used to deflect the beam over a range of angles. As was mentioned several times, these implementations were also specifically designed for application to a resonant mirror structure that deflects the beam but undergoes periodic angular acceleration. These implementations also have application to situations where the beam is swept along in a linear fashion, e.g. the deflection mirror is attached to a linear actuator instead of a rotary actuator and knowledge of the linear displacement of the beam is required.

As was mentioned several times, the sample beam used to measure the angular position and the measurement beam could be split off of a single beam before the rotor, after the rotor or even originate from separate sources. The beam paths could be co-linear, parallel or even entirely separate, e.g. off different mirrors on the rotor. As long as the deflection path for the sample beam and the deflection path for the sweep of the measuring beam are rigidly coupled, the acquisition and analysis techniques discussed here should suffice to obtain accurate angular beam position data.

Many of the analytical methods described utilize Tick and Tock sensors to obtain final angular position values. Most of these techniques can be accomplished using single detectors. However, in all cases, the resolution and jitter will be improved by employing a bi-cell as described in the prior art. Further, most of the optical techniques present the option of using the first and last trigger transitions as the Tick and Tock signals and doing away with the redundant measurements and associated components.

When designing optical instruments for commercial deployment, it is desired to have rugged, compact cases. To support this, many of the implementations show turning mirrors to fold the sample beam path down to run parallel with the axis of the rotor. In all cases, compactness is a desirable design feature but the folding mirrors are not required to use the techniques discussed here. Along those lines, it is generally desired to have as much distance from the rotor to the optical detectors in order to improve the optical leverage and increase the resolution of the trigger signals. One method mentioned previously for applying the preceding techniques while maximizing the sample beam path length in a system like that in FIGS. 16a and 16b would be to place a slightly cocked mirror at the end of the rotor to bounce the sample beam back down the length of the case one or more times to a bi-cell placed near the turning mirror. This will work for most of the optical trigger techniques described here to double (or more) the path length without affecting the case geometry.

Those of ordinary Skill in the art will recognize that various modifications and variations may be made to the embodiments described above without departing from the spirit and scope of the present invention. For example, the preceding techniques do not have to be implemented alone, they can be combined to produce hybrid techniques that might fit a specific application better than a single tecknique. As a specific example, referring to FIGS. 14a and 14b, more trigger events would be obtained with the addition of a photo-diode array similar to that in FIG. 10 instead of the single bi-cell and would result in many trigger events from the existing smaller light pipe structure without growing the structure to block the optics path to the far end of the rotor. It is therefore to be understood that the present invention is not limited to the particular embodiments disclosed above, but it is intended to cover such modifications and variations as defined by the following claims.

What is claimed is:

1. A system for high-precision determination of the angular position of a light beam in an optical scanning device, the system comprising:
   a source of light that emits a substantially collimated primary light beam;
   a light-sensitive sensor;
   an optical element used to focus an image onto the sensor; and
   a rotatable mirror system that re-directs the primary light beam to a plurality of locations of an external surface of a component, the rotatable mirror system comprising:
   a rotary axis;
   a mirror structure that rotates about the rotary axis;
   at least one detector positioned to intercept a light beam that has been reflected off the mirror structure at an angle representing a start-of-scan such that a first trigger pulse is generated, and positioned to intercept a light beam that has been reflected off the mirror structure at an angle representing an end-of-scan such that a second trigger pulse is generated; and
   an auxiliary system that provides measurement data between the start-of-scan angle and the end-of-scan angle;
   wherein the first trigger pulse and the measurement data are used to determine the angular position of the primary light beam.

2. The system of claim 1, wherein the auxiliary system includes a measurement device which is coupled to the rotary axis, and wherein the first and second trigger pulses and the measurement data are all used to determine the angular position of the primary light beam.

3. The system of claim 2, wherein the measurement device is at least one item selected from the group consisting of a potentiometer, an optical encoder, a magnetic encoder, a resolver, a rotary variable differential transformer, and combinations thereof.

4. The system of claim 2, wherein the auxiliary system further includes a digital filter that smoothes the measurement data.

5. The system of claim 4, wherein the digital filter employs an adaptive nearest neighbor smoothing algorithm.

6. The system of claim 4, wherein the digital filter is selected from the group consisting of a windowed FIR filter, a wavelet filter, and combinations thereof.

7. The system of claim 4, wherein a spline or high-order polynomial is applied to the smoothed measurement data.

8. The system of claim 2, wherein the measurement data is adjusted using a fixed pattern offset error mapping function.

9. The system of claim 8, wherein the mapping function is derived from data which has been smoothed.

10. The system of claim 1, wherein the auxiliary system includes an auxiliary light-sensitive sensor and a beam splitter, wherein the beam splitter is positioned to intercept the primary light beam subsequent to reflecting off of the mirror structure, and wherein the beam splitter re-directs a portion of the primary light beam onto the auxiliary sensor.

11. The system of claim 1, wherein the auxiliary system includes an auxiliary light-sensitive sensor and a beam splitter, wherein the beam splitter is positioned to intercept the primary light beam prior to reflecting off of the mirror structure, and wherein the beam splitter re-directs a portion of the primary light beam onto the mirror structure which reflects the re-directed primary light beam portion onto the auxiliary sensor.

12. The system of claim 11, wherein the auxiliary system further includes a folding mirror which is positioned to intercept the re-directed primary light beam portion subsequent to reflecting off the mirror structure, wherein the folding mirror reflects the re-directed primary light beam portion directly onto the auxiliary sensor.

13. The system of claim 1, wherein the auxiliary system includes an auxiliary light-sensitive sensor and an auxiliary light source, wherein the auxiliary light source emits a substantially collimated auxiliary light beam onto the mirror structure which reflects the auxiliary light beam onto the auxiliary sensor.

14. The system of claim 13, wherein at least one of the first trigger pulse and the second trigger pulse is used as a fixed reference to the auxiliary light beam in determining the angular position of the primary light beam.

15. The system of claim 13, wherein the primary light beam is reflected off a portion of the mirror structure while the auxiliary light beam is simultaneously reflected off a different portion of the mirror structure.

16. The system of claim 10, wherein the auxiliary system further includes an imaging element which is positioned to intercept the re-directed primary light beam portion between the beam splitter and the auxiliary sensor.

17. The system of claim 11, wherein the auxiliary system further includes an imaging element which is positioned to intercept the re-directed primary light beam portion between the mirror structure and the auxiliary sensor.

18. The system of claim 13, wherein the auxiliary system further includes an imaging element which is positioned to intercept the auxiliary light beam between the mirror structure and the auxiliary sensor.

19. The system of claim 16, wherein the imaging element comprises a substantially telecentric element.

20. The system of claim 17, wherein the imaging element comprises a substantially telecentric element.

21. The system of claim 18, wherein the imaging element comprises a substantially telecentric element.

22. The system of claim 10, wherein the auxiliary sensor comprises a PSD type sensor.

23. The system of claim 11, wherein the auxiliary sensor comprises a PSD type sensor.

24. The system of claim 13, wherein the auxiliary sensor comprises a PSD type sensor.

25. The system of claim 10, wherein the auxiliary sensor comprises an array of auxiliary detectors arranged at pre-determined angular intervals for generating a series of discrete trigger pulses as the re-directed primary light beam portion sweeps across the array of auxiliary detectors, wherein the measurement data comprises the series of discrete trigger pulses.

26. The system of claim 11, wherein the auxiliary sensor comprises an array of auxiliary detectors arranged at pre-determined angular intervals for generating a series of discrete trigger pulses as the re-directed primary light beam portion sweeps across the array of auxiliary detectors, wherein the measurement data comprises the series of discrete trigger pulses.

27. The system of claim 13, wherein the auxiliary sensor comprises an array of auxiliary detectors arranged at pre-determined angular intervals for generating a series of discrete trigger pulses as the auxiliary light beam sweeps across the array of auxiliary detectors, wherein the measurement data comprises the series of discrete trigger pulses.

28. The system of claim 25, wherein the auxiliary system further includes a comparator, wherein the array of auxiliary detectors are configured such that the output of every other auxiliary detector within the array of auxiliary detectors is connected in common to an input of the comparator, and wherein the outputs of the remaining auxiliary detectors within the array of auxiliary detectors are connected in common to another input of the comparator.

29. The system of claim 26, wherein the auxiliary system further includes a comparator, wherein the array of auxiliary detectors are configured such that the output of every other auxiliary detector within the array of auxiliary detectors is connected in common to an input of the comparator, and wherein the outputs of the remaining auxiliary detectors within the array of auxiliary detectors are connected in common to another input of the comparator.

30. The system of claim 27, wherein the auxiliary system further includes a comparator, wherein the array of auxiliary detectors are configured such that the output of every other auxiliary detector within the array of auxiliary detectors is connected in common to an input of the comparator, and wherein the outputs of the remaining auxiliary detectors within the array of auxiliary detectors are connected in common to another input of the comparator.

31. The system of claim 25, wherein the measurement data is adjusted using a fixed pattern offset error mapping function.

32. The system of claim 26, wherein the measurement data is adjusted using a fixed pattern offset error mapping function.

33. The system of claim 27, wherein the measurement data is adjusted using a fixed pattern offset error mapping function.

34. The system of claim 31, wherein the mapping function is derived from data which has been smoothed.

35. The system of claim 32, wherein the mapping function is derived from data which has been smoothed.

36. The system of claim 33, wherein the mapping function is derived from data which has been smoothed.

37. The system of claim 16, wherein the auxiliary system further includes an aperture mask, wherein the auxiliary sensor comprises an auxiliary bi-cell detector which has a first half and a second half separated by a dividing line oriented along the direction that the re-directed primary light beam portion sweeps, wherein the aperture mask is positioned to intercept the re-directed primary light beam portion between the beam splitter and the auxiliary bi-cell detector, wherein a first row of the aperture mask includes a pattern of alternating transparent and opaque regions, wherein a second row of the aperture mask includes another pattern of alternating transparent and opaque regions which are identical but out of phase to the regions of the pattern of the first row of the aperture mask, wherein the first row of the aperture mask alternately passes a first portion of the re-directed primary light beam portion to the first half of the auxiliary bi-cell detector as the re-directed primary light beam portion sweeps along the aperture mask, wherein the second row of the aperture mask alternately passes a second portion of the re-directed primary light beam portion to the second half of the auxiliary bi-cell detector as the re-directed primary light beam portion sweeps along the aperture mask, and wherein alternating variations of the received intensities detected by the first and second halves of the auxiliary bi-cell detector are used to create discrete trigger pulses, wherein the measurement data comprises the discrete trigger pulses.

38. The system of claim 17, wherein the auxiliary system further includes an aperture mask, wherein the auxiliary sensor comprises an auxiliary bi-cell detector which has a first half and a second half separated by a dividing line oriented along the direction that the re-directed primary light beam portion sweeps, wherein the aperture mask is positioned to intercept the re-directed primary light beam portion between the mirror structure and the auxiliary bi-cell detector, wherein a first row of the aperture mask includes a pattern of alternating transparent and opaque regions, wherein a second row of the aperture mask includes another pattern of alternating transparent and opaque regions which are identical but out of phase to the regions of the pattern of the first row of the aperture mask, wherein the first row of the aperture mask alternately passes a first portion of the re-directed primary light beam portion to the first half of the auxiliary bi-cell detector as the re-directed primary light beam portion sweeps along the aperture mask, wherein the second row of the aperture mask alternately passes a second portion of the re-directed primary light beam portion to the second half of the auxiliary bi-cell detector as the re-directed primary light beam portion sweeps along the aperture mask, and wherein alternating variations of the received intensities detected by the first and second halves of the auxiliary bi-cell detector are used to create discrete trigger pulses, wherein the measurement data comprises the discrete trigger pulses.

39. The system of claim 18, wherein the auxiliary system further includes an aperture mask, wherein the auxiliary sensor comprises an auxiliary bi-cell detector which has a first half and a second half separated by a dividing line oriented along the direction that the auxiliary light beam sweeps, wherein the aperture mask is positioned to intercept the auxiliary light beam between the mirror structure and the auxiliary bi-cell detector, wherein a first row of the aperture mask includes a pattern of alternating transparent and opaque regions, wherein a second row of the aperture mask includes another pattern of alternating transparent and opaque regions which are identical but out of phase to the regions of the pattern of the first row of the aperture mask, wherein the first row of the aperture mask alternately passes a first portion of the auxiliary light beam to the first half of the auxiliary bi-cell detector as the auxiliary light beam sweeps along the aperture mask, wherein the second row of the aperture mask alternately passes a second portion of the auxiliary light beam to the second half of the auxiliary bi-cell detector as the auxiliary light beam sweeps along the aperture mask, and wherein alternating variations of the received intensities detected by the first and second halves of the auxiliary bi-cell detector are used to create discrete trigger pulses, wherein the measurement data comprises the discrete trigger pulses.

40. The system of claim 10, wherein the auxiliary system further includes a light pipe, wherein the light pipe is positioned to intercept the re-directed primary light beam portion, wherein the light pipe comprises at least two mirrors having a gap therebetween, wherein the re-directed primary light beam portion is transmitted through the gap at varying pointing angles as the re-directed primary light beam portion sweeps, wherein at one of the varying pointing angles the re-directed primary light beam portion is reflected off one of the at least two mirrors onto the auxiliary sensor, and at at least one other of the varying pointing angles the re-directed primary light beam portion is reflected off at least one other of the at least two mirrors onto the auxiliary sensor, resulting in at least two discrete trigger pulses at the auxiliary sensor, wherein the measurement data comprises the at least two discrete trigger pulses.

41. The system of claim 11, wherein the auxiliary system further includes a light pipe, wherein the light pipe is positioned to intercept the re-directed primary light beam portion, wherein the light pipe comprises at least two mirrors having a gap therebetween, wherein the re-directed primary light beam portion is transmitted through the gap at varying pointing angles as the re-directed primary light beam portion sweeps, wherein at one of the varying pointing angles the re-directed primary light beam portion is reflected off one of the at least two mirrors onto the auxiliary sensor, and at at least one other of the varying pointing angles the re-directed primary light beam portion is reflected off at least one other of the at least two mirrors onto the auxiliary sensor, resulting in at least two discrete trigger pulses at the auxiliary sensor, wherein the measurement data comprises the at least two discrete trigger pulses.

42. The system of claim 13, wherein the auxiliary system further includes a light pipe, wherein the light pipe is positioned to intercept the auxiliary light beam, wherein the light pipe comprises at least two mirrors having a gap therebetween, wherein the auxiliary light beam is transmitted through the gap at varying pointing angles as the auxiliary light beam sweeps, wherein at one of the varying pointing angles the auxiliary light beam is reflected off one of the at least two mirrors onto the auxiliary sensor, and at at least one other of the varying pointing angles the auxiliary light beam is reflected off at least one other of the at least two mirrors onto the auxiliary sensor, resulting in at least two discrete trigger pulses at the auxiliary sensor, wherein the measurement data comprises the at least two discrete trigger pulses.

43. The system of claim 40, wherein the light pipe is positioned to intercept the re-directed primary light beam portion between the beam splitter and the auxiliary sensor.

44. The system of claim 41, wherein the light pipe is positioned to intercept the re-directed primary light beam portion between the mirror structure and the auxiliary sensor.

45. The system of claim 42, wherein the light pipe is positioned to intercept the auxiliary light beam between the mirror structure and the auxiliary sensor.

46. The system of claim 40, wherein the auxiliary system further includes a folding mirror positioned at an end of the light pipe which is opposite an entrance of the light pipe, wherein the folding mirror folds the path of the re-directed primary light beam portion within the light pipe, and wherein the auxiliary sensor is positioned at the entrance of the light pipe.

47. The system of claim 41, wherein the auxiliary system further includes a folding mirror positioned at an end of the light pipe which is opposite an entrance of the light pipe, wherein the folding mirror folds the path of the re-directed primary light beam portion within the light pipe, and wherein the auxiliary sensor is positioned at the entrance of the light pipe.

48. The system of claim 42, wherein the auxiliary system further includes a folding mirror positioned at an end of the light pipe which is opposite an entrance of the light pipe, wherein the folding mirror folds the path of the auxiliary light beam within the light pipe, and wherein the auxiliary sensor is positioned at the entrance of the light pipe.

49. The system of claim 40, wherein the gap is tapered so as to control the angular occurrence of the discrete trigger pulses.

50. The system of claim 41, wherein the gap is tapered so as to control the angular occurrence of the discrete trigger pulses.

51. The system of claim 42, wherein the gap is tapered so as to control the angular occurrence of the discrete trigger pulses.

52. The system of claim 11, wherein the auxiliary system further includes a diffractive element which is positioned to intercept the re-directed primary light beam portion at the surface of the mirror structure resulting in a series of diffracted beams, wherein the series of diffracted beams sweeps across the auxiliary sensor as the mirror structure rotates resulting in a corresponding series of discrete trigger pulses, wherein the measurement data comprises the corresponding series of discrete trigger pulses.

53. The system of claim 13, wherein the auxiliary system further includes a diffractive element which is positioned to intercept the auxiliary light beam at the surface of the mirror structure resulting in a series of diffracted beams, wherein the series of diffracted beams sweeps across the auxiliary sensor as the mirror structure rotates resulting in a corresponding series of discrete trigger pulses, wherein the measurement data comprises the corresponding series of discrete trigger pulses.

54. The system of claim 52, wherein the diffractive element comprises a compensative configuration so as to compensate for varying intensities of the series of diffracted beams.

55. The system of claim 53, wherein the diffractive element comprises a compensative configuration so as to compensate for varying intensities of the series of diffracted beams.

56. The system of claim 11, wherein the auxiliary system further includes a beam creating element which is positioned to intercept the re-directed primary light beam portion between the beam splitter and the mirror structure thereby resulting in a series of beams, wherein the series of beams are subsequently reflected off the mirror structure and sweep across the auxiliary sensor as the mirror structure rotates resulting in a corresponding series of discrete trigger pulses, wherein the measurement data comprises the corresponding series of discrete trigger pulses.

57. The system of claim 13, wherein the auxiliary system further includes a beam creating element which is positioned to intercept the auxiliary light beam prior to reflecting off the mirror structure thereby resulting in a series of beams, wherein the series of beams are subsequently reflected off the mirror structure and sweep across the auxiliary sensor as the mirror structure rotates resulting in a corresponding series of discrete trigger pulses, wherein the measurement data comprises the corresponding series of discrete trigger pulses.

58. The system of claim 56, wherein the beam creating element comprises a diffractive element.

59. The system of claim 57, wherein the beam creating element comprises a diffractive element.

60. The system of claim 56, wherein the beam creating element comprises a holographic element.

61. The system of claim 57, wherein the beam creating element comprises a holographic element.

62. The system of claim 56, wherein the beam creating element comprises a reflective element.

63. The system of claim 57, wherein the beam creating element comprises a reflective element.

64. The system of claim 56, wherein the auxiliary system further includes at least one optical collection element which is positioned to intercept the series of beams between the beam creating element and the mirror structure.

65. The system of claim 57, wherein the auxiliary system further includes at least one optical collection element which is positioned to intercept the series of beams between the beam creating element and the mirror structure.

66. The system of claim 1, wherein the mirror structure includes a plurality of primary mirrors positioned substantially concentrically surrounding the rotary axis.

67. The system of claim 1, wherein the mirror structure oscillates about the rotary axis with a torsional motion.

68. The system of claim 1, wherein each of the at least one detector is a bi-cell detector.

69. The system of claim 25, wherein the array of auxiliary detectors comprises an array of bi-cell detectors.

70. The system of claim 26, wherein the array of auxiliary detectors comprises an array of bi-cell detectors.

71. The system of claim 27, wherein the array of auxiliary detectors comprises an array of bi-cell detectors.

* * * * *